Feb. 18, 1936.　　　C. H. HAVILL　　　2,030,986
AUTOMATIC AIRPLANE PILOT
Filed Oct. 6, 1932　　　4 Sheets-Sheet 1
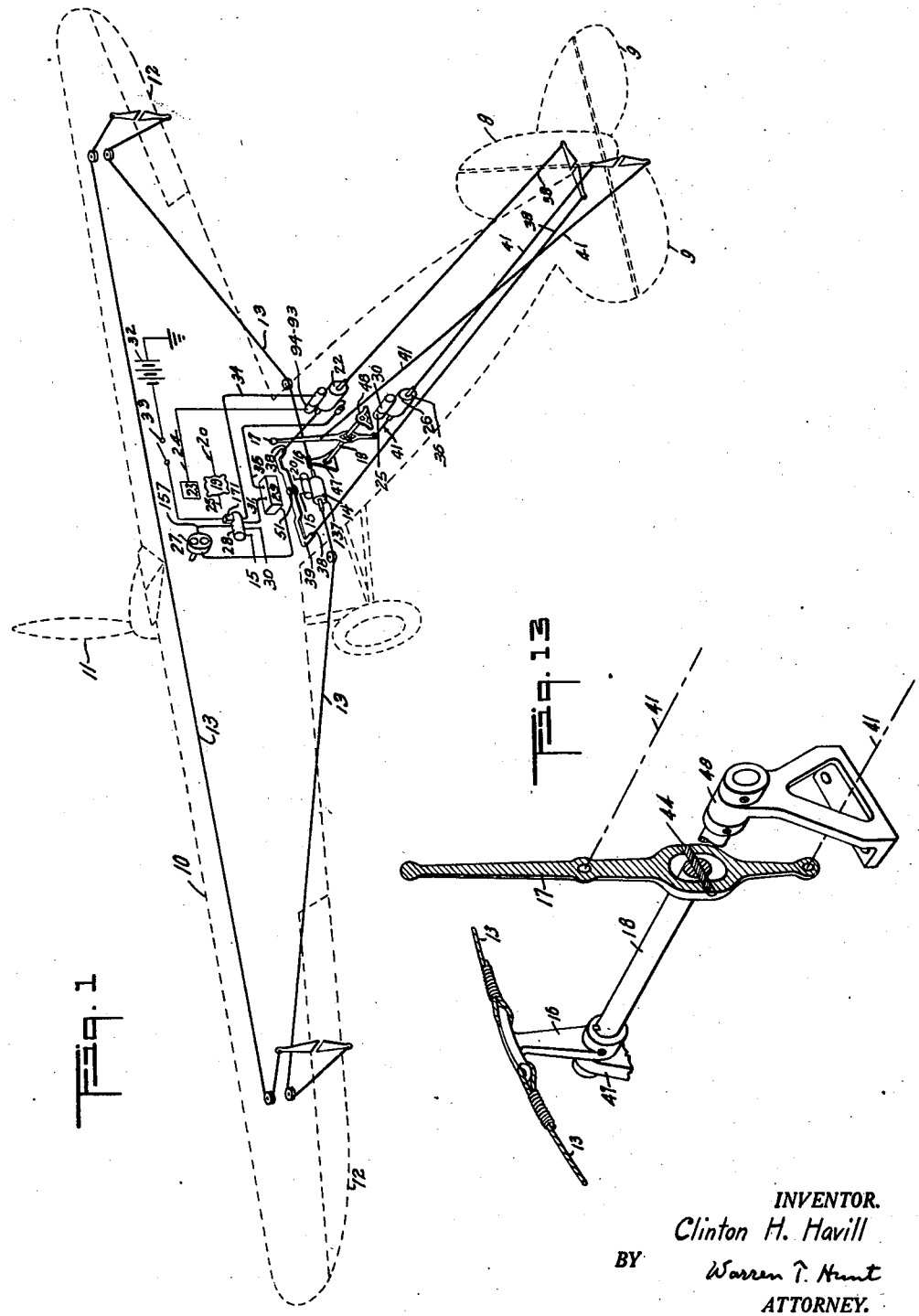
INVENTOR.
Clinton H. Havill
BY Warren T. Hunt
ATTORNEY.

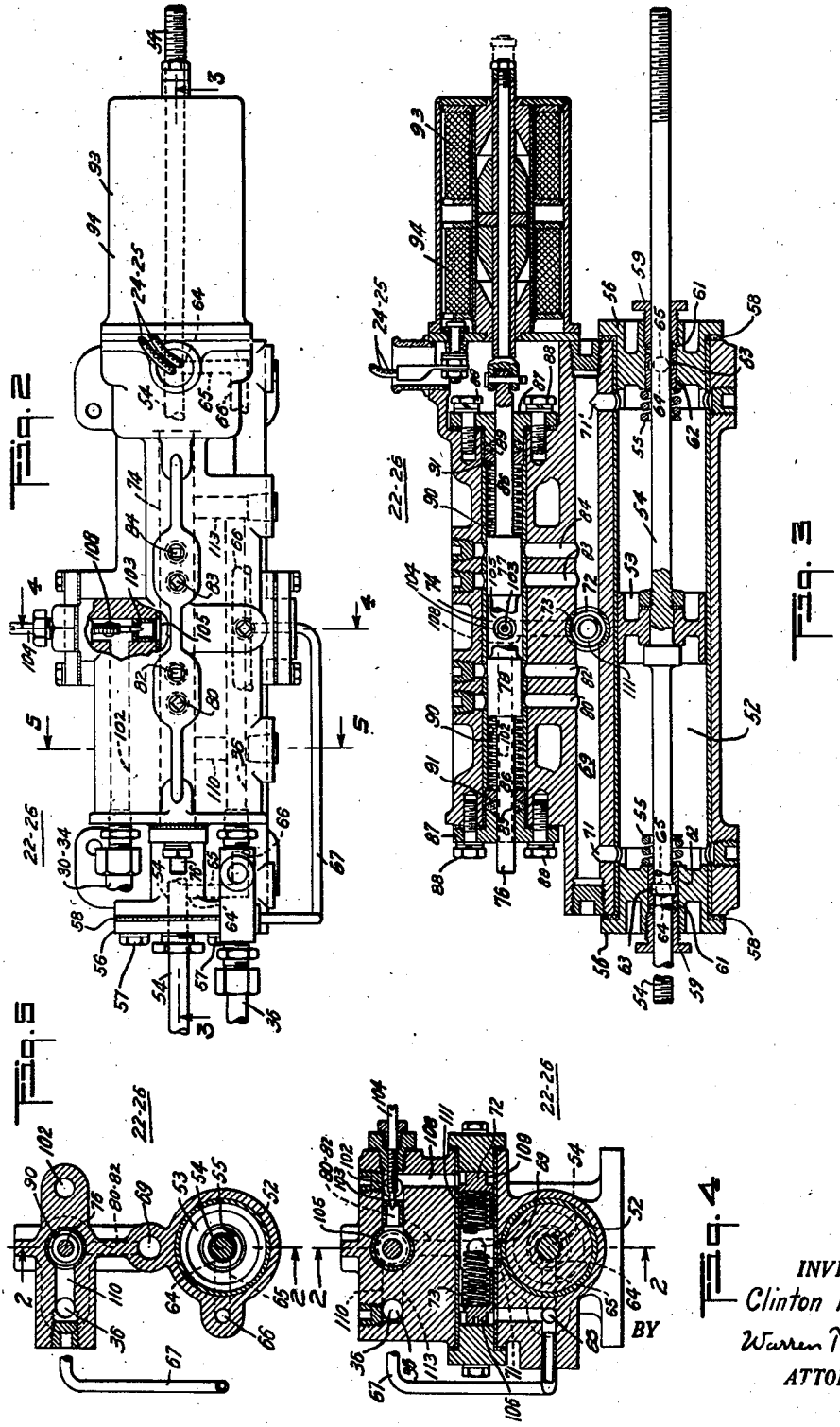

Feb. 18, 1936. C. H. HAVILL 2,030,986
AUTOMATIC AIRPLANE PILOT
Filed Oct. 6, 1932 4 Sheets-Sheet 3
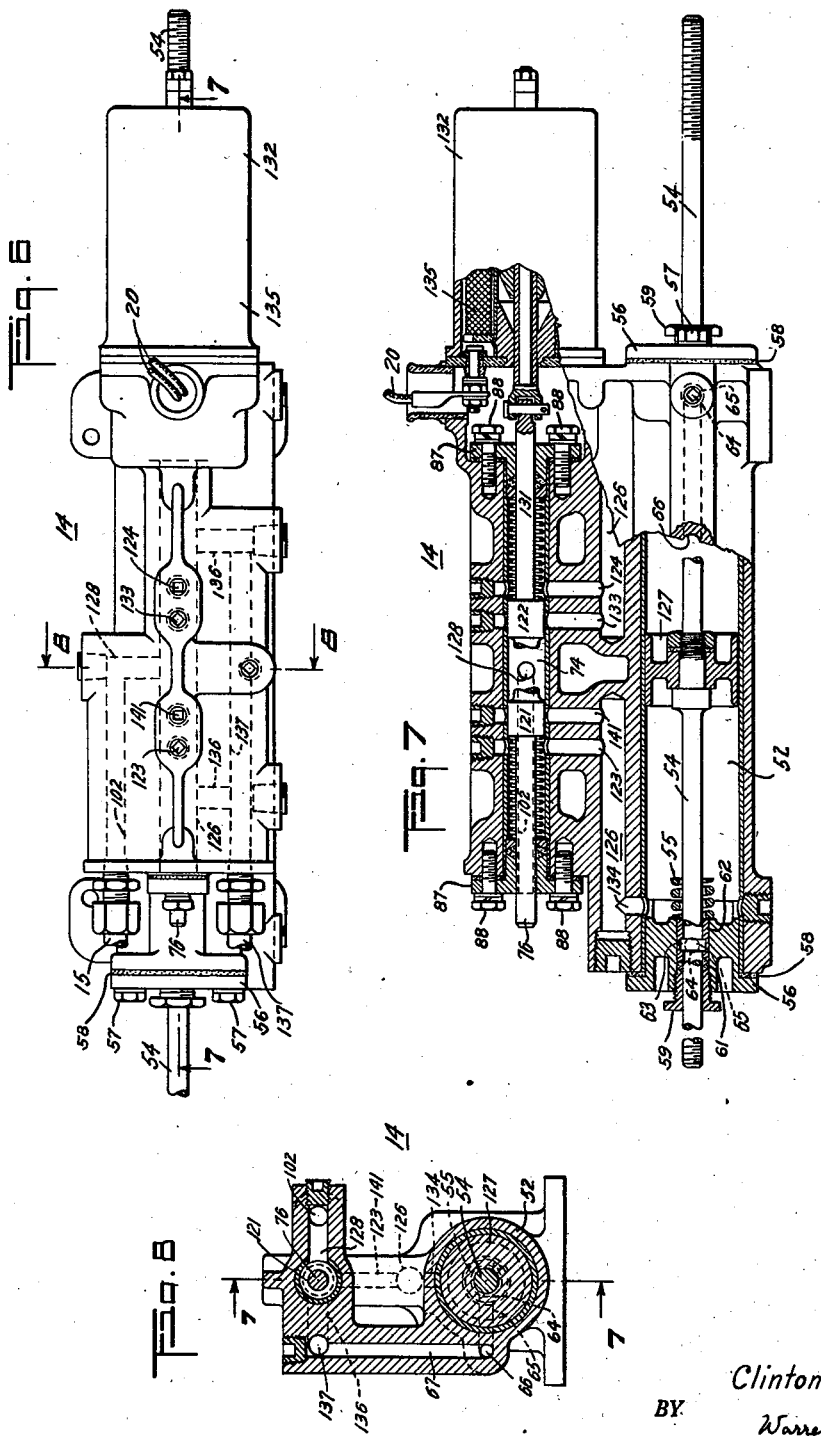
INVENTOR.
Clinton H. Havill
BY
Warren T. Hunt
ATTORNEY.

Feb. 18, 1936.　　　C. H. HAVILL　　　2,030,986
AUTOMATIC AIRPLANE PILOT
Filed Oct. 6, 1932　　　4 Sheets-Sheet 4
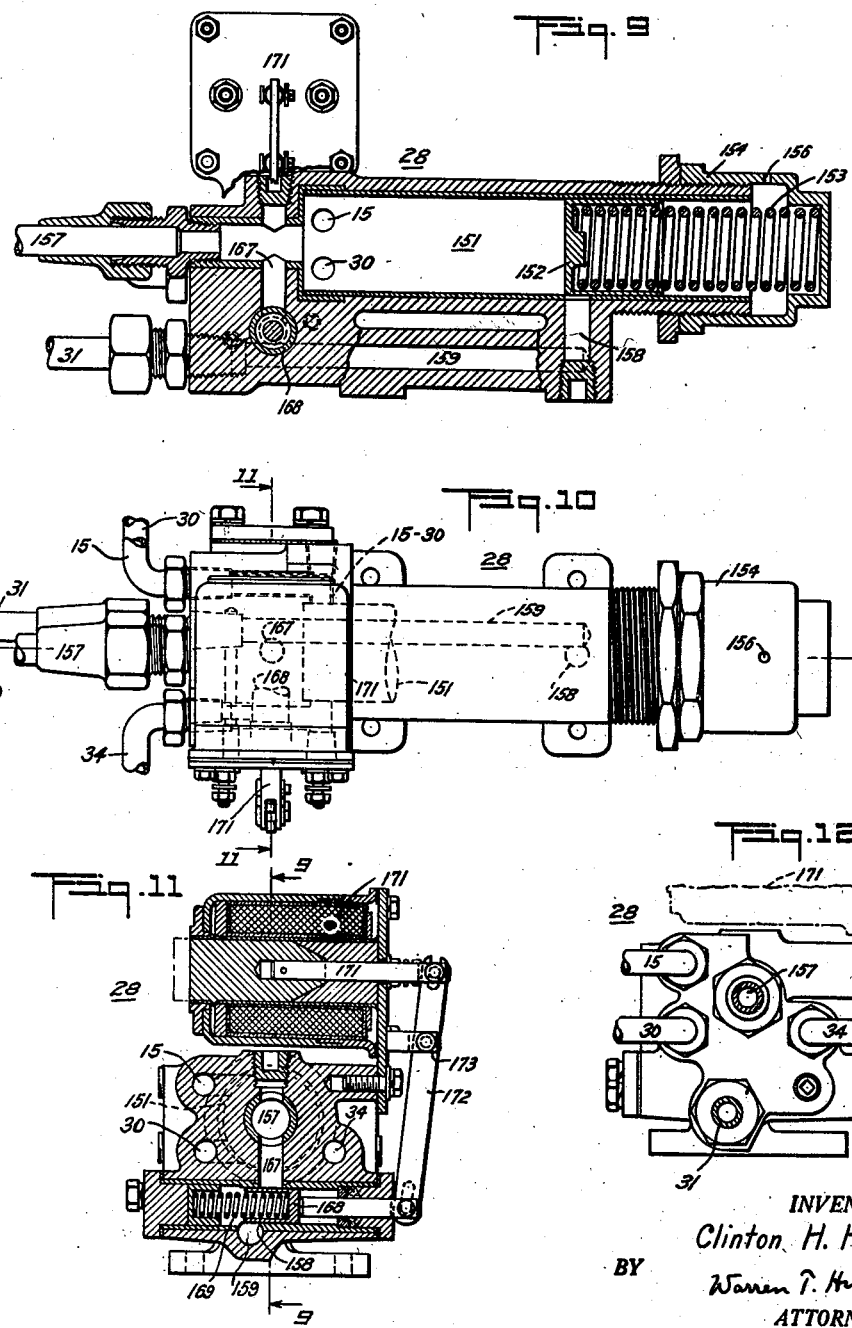
INVENTOR.
Clinton H. Havill
BY Warren T. Hunt
ATTORNEY.

Patented Feb. 18, 1936

2,030,986

UNITED STATES PATENT OFFICE 2,030,986

AUTOMATIC AIRPLANE PILOT

Clinton H. Havill, South Orange, N. J., assignor, by mesne assignments, to Eclipse Aviation Corporation, East Orange, N. J., a corporation of New Jersey Application October 6, 1932, Serial No. 636,605.

21 Claims. (Cl. 244—29)

This invention relates to airplanes and more particularly to automatic airplane controls or pilots.

An object of the invention is to provide an airplane with an automatic control that will stabilize the plane about coordinate axes.

Another object of the invention is to provide an airplane with an automatic control and a manual control, the arrangement of parts being such that the manual control is immediately available in case of failure of the automatic control.

Another object of the invention is to provide an airplane with an automatic hydraulically operated control which will introduce very slight resistance to manual operation when the hydraulic control is inoperative.

Another object of the invention is to provide an automatic airplane control for the elevator, rudder and ailerons in which the elevator and rudder are locked against manual operation when the automatic control is operative but in which the ailerons are manually movable against the force of the automatic control.

Another object of the invention is to so interconnect a manual and an automatic control for an airplane that the manual control is moved by the automatic control to provide an indication of the amount of movement of the automatic control.

Another object of the invention is to provide an airplane with an automatic control in which a gyroscopic device is used to control a hydraulic servo-motor that is interconnected with movable surfaces of the plane.

Another object of the invention is to provide an airplane with a plurality of servo-motor devices in which certain of the devices are locked against manual operation and others of which may be manually actuated by superimposing manual force upon the servo-motor force.

Another object of the invention is to provide a remote control for an airplane servo-motor which may be located on the instrument board of the plane.

Other objects of the invention will appear from the following description in connection with which an illustrative embodiment of the invention has been shown in the accompanying drawings in which:

Fig. 1 is a schematic view of the general arrangement of the controlling devices;

Fig. 2 is a top plan view of the servo-motor used to actuate the rudder and elevator controls;

Fig. 3 is a longitudinal sectional view taken along the line 3—3 of Fig. 2;

Fig. 4 is a transverse sectional view taken on the line 4—4 of Fig. 2;

Fig. 5 is a transverse sectional view on the line 5—5 of Fig. 2;

Fig. 6 is a top plan view of the servo-motor used to actuate the aileron control;

Fig. 7 is a longitudinal sectional view taken on the line 7—7 of Fig. 6;

Fig. 8 is a transverse sectional view taken on the line 8—8 of Fig. 6;

Fig. 9 is a longitudinal sectional view of the distributing and relief valve device shown partly in elevation as taken along the line 9—9 of Fig. 11;

Fig. 10 is a top plan view of the distributing device shown in Fig. 9;

Fig. 11 is a transverse sectional view taken on the line 11—11 of Fig. 10;

Fig. 12 is an end view of the distributing device showing the fluid connections to the various parts; and Fig. 13 is a perspective view of the manual control device.

The invention may be described briefly as comprising a set of three servo-motors, the pressure for which is supplied by a circulating oil pump and each of the servo-motors being controlled by well known indicating instruments. The instruments used in the illustrative embodiment are preferably of the gyroscopic type. The rudder is controlled by an ordinary directional gyroscope or compass and the ailerons and elevator are controlled by movements of the well known artificial horizon. Manual controls are also incorporated which are interconnected with the servo-motors so as to be operative immediately upon possible failure of the automatic control. The servo-motors actuating the elevator and rudder are preferably constructed so that during the operation of the automatic control, the manual control will be locked against operation so that it will be impossible for the operator to change either the rudder or elevator by a manual operation unless the servo-motors be disconnected. The servo-motor used for actuating the ailerons has no provision for locking it to prevent manual operation and the force of the operator may be superimposed upon the force of the servo-motor at any time, this connection being desirable, as it gives the pilot the opportunity of immediately correcting the banking of the plane. At the same time it allows the greater portion of the control to be effected automatically.

Referring to the drawings and particularly to Fig. 1, the numeral 10 generally designates the airplane having a propeller 11, a rudder 8, elevators 9, and ailerons 12. The ailerons are connected by cables 13 and to a servo-motor 14 which is operable to pull cables 13 in either direction for tilting of the ailerons and cause rotation of the plane as a whole about a longitudinal axis, this action being ordinarily known as banking. The cables 13 are also secured to member 16 which is connected with the manual control lever 17 by shaft 18. Servo-motor 14 is controlled through a valve mechanism, hereinafter more fully described, by one of the movements of the artificial horizon instrument 19, the connection between the artificial horizon indicator and the servo-motor being preferably through an electrical mechanism and a solenoid hereinafter more fully described, the wires controlling the valve being indicated in Fig. 1 at 20.

The rudder and elevator control are each controlled by identical servo-motors. Servo-motor 22 which is used to actuate the rudder 8 is preferably electrically controlled by the direction indicating instrument 23 through a pair of wires 24, and servo-motor 26 for actuating the elevator is electrically controlled by another movement of the artificial horizon instrument 19 through a pair of wires 25 therefrom. All of the servo-motors are hydraulically actuated by a pump 27 which is driven by the engine (not shown) and ordinarily delivers pressure to each of the servo-motors through a distributing device 28 which acts as a relief valve to allow excess pressure to return to the oil reservoir 29 through overflow pipe 31 and also acts as a shut-off valve to render all of the servo-motors inactive and permit manual control of the plane.

The cutting off of the servo-motors from the pressure system is preferably actuated by an electric device in order to permit the control to be placed upon the instrument board, and in Fig. 1 the battery is indicated at 32 and the control switch at 33, the arrangement being such that when the switch 33 is closed, oil pressure is forced to the servo-motors and the automatic control is in a position to be operative. Each of the servo-motors is also provided with a return pipe to allow the oil pressure to be relieved and the fluid returned to the sump 29.

In Fig. 1 servo-motor 22 is the only one in which all the connections are shown and it is understood that each of the servo-motors is provided with control wires leading from a source of electrical energy as indicated by numerals 20 and 25 to the respective instruments, and also a delivery pipe and return pipe, the delivery pipe to servo-motor 22 being indicated at 34 and the return pipe at 36. Servo-motor 22 is connected with rudder 8 by cables 38 which are also connected to the opposite ends of the manual rudder control bar 39. Servo-motor 26 is connected to elevators 9 by cables 41 and also to manual control lever 17. It will be understood by the above description that all of the airplane controls may be actuated by servo-motors, but at the same time they are directly connected to the manual control lever 17, and the rudder bar 39 through which they may be controlled immediately in case of possible failure of the automatic control system, and that lever 17 will be moved by the automatic controls in a manner to indicate which of the various controls is being moved by the servo-motors. The instruments 19 and 23 preferably are connected to the electric controls, in a manner to permit both of the instruments to operate in their usual manner, to indicate to the pilot the attitude of the airplane. The manual control lever 17, as best shown in Fig. 13, may be of any well known type and as shown is pivotally mounted upon pin 44 passing through shaft 18 that is suitably mounted in bearings 47 and 48. Forward or rearward rocking of lever 17 causes no rotation of shaft 18 but serves to actuate the elevators through cables 41. Rocking lever 17 in a plane at right angles to the axis of shaft 18 causes no appreciable movement of cables 41, but rocks lever or saddle 16 to move cables 13 for controlling the ailerons. Manual movement of the rudder 8 is produced by rotation of rudder bar 39 about its pivotal point 51.

As before stated, the rudder and elevator servo-motors are identical and therefore only one of these will be described. In Fig. 3 the body of the device is provided with a cylinder 52 within which reciprocates a piston 53 that is connected to a shaft 54 extending through opposite ends of the cylinder and adapted to be connected to the cables as shown in Fig. 1. Each end of the cylinder is closed by a cap 56 fastened to the cylinder by bolts 57 shown in Fig. 2, and preferably provided with a sealing gasket 58. A packing gland 59 surrounds rod 54 at each end of the cylinder by which packing 61 may be compressed to prevent leakage from the cylinder and bumper springs 55 which encircle the rods 54, are preferably located at each end of the cylinder.

A bearing 62 is provided at each end of the cylinder having an oil groove 63 formed therein which communicates with drain holes 64 in the bearings and into which excess oil may pass through cored holes 65 in the cylinder to a passage 66 from whence the excess oil may be directed back to the oil reservoir 29 by pipe 67. A cored passage 69 is located immediately above cylinder 52 which has a communication with the cylinder on opposite sides of the piston 53 by virtue of ports 71—71'. During operation of the servo-motor the ends of cored passage 69 are separated one from the other by a valve 72 which will be hereinafter more fully described and which is illustrated in Fig. 4. Immediately above the cored passage 69 is the valve cylinder 74 in which is slidable a balanced piston valve 76 having cylindrical portions 77 and 78 adapted to close conduits 80, 82, 83, and 84 when the valve is in the neutral position as shown in Fig. 3. Opposite ends of valve operating shaft 86 are enclosed by packing glands 87 held in position by bolts 88 and serving to clamp packing 89 about the shaft. Valve 76 is normally urged to its central or neutral position by springs 90 coacting between the cylindrical portions 77 and 78 and packing glands 91. Shaft 86 is moved to the right or left, as the case may be, by solenoids 93 and 94 which are energized from any suitable source of current by wires 24—25 which are connected to the instruments 23 or 19 depending on whether the servo-motor is to be used to actuate the rudder or the elevator. Pressure for actuating piston 53 is supplied from the pump 27 by conduit 34 which leads through passage 102 to the orifice 103, Fig. 4, controlled by the adjusting valve 104 and into the space 105 formed by the reduced portion of the valve stem between cylindrical portions 77 and 78. When pressure is supplied to the recess 105, oil may pass downwardly through passage 108 and act on the outer end of sleeve 109 whereby the sleeve will be forced inwardly against the compression of spring 111, from the position shown in Fig. 4, to close conduit 69 and check the flow of fluid between the right and left portions thereof, as viewed in Fig. 3. The sleeve 106 forming a seat for spring 111 is provided with a slot 73 that connects the space on the inner side of valve 72 with passage 66 to vent the space and permit inward movement of the valve. Movement of valve shaft 86 toward the right, as viewed in Fig. 3, by energization of solenoid 93 causes cylindrical portions 78 to uncover passage 80 and cylindrical portions 77 to uncover passage 83. In this position of the valve, oil will be forced from recess 105 through passage 83 to the right side portion of conduit 69 and through port 71' into the cylinder 52 and cause piston 53 to be moved toward the left and move the cables 38 to actuate the rudder, or cables 41 to actuate the elevator, depending on which servo-motor is being described, it being understood that the servo-motors for the rudders and elevator are identical but operative under different conditions and by different instruments. As piston 53 is moved toward the left the oil present on the left side of the piston will be forced out of port 71 into conduit 69 and through passage 80 to the left of cylindrical portion 78 from whence it will be returned to the sump 29 by means of passage 110 and return pipe 36.

If valve shaft 86 is moved toward the left by energization of solenoid 94, passageway 82 will become the inlet opening and passageway 84 will become the exhaust opening. Piston 53 will then be moved toward the right, as viewed in Fig. 3, and the oil on the right side of the piston will exhaust through ports 71' and 84 to the right side of cylindrical portion 77, to return to the sump by passages 113 and 36, as best viewed in Fig. 2.

The servo-motor 14, shown in Figs. 6, 7, and 8, for use in controlling the ailerons is quite similar in principle to that used in controlling the elevator and rudder, except that cylindrical portions 121 and 122 of the operating valve are somewhat shorter and do not close passages 123 and 124 when the valve is in a neutral position and therefore there is no necessity of providing an automatic valve such as shown at 72, Fig. 3, in the conduit for connecting or disconnecting the right and left portions of conduit 126, for it will be readily seen that piston 127 may be moved by a manual operation while the valve is in the central position and the fluid on the compression side of the piston may be exhausted through one of the passageways 123 and 124 and allow freedom of movement of the aileron control, even though pressure is supplied to the servo-motor valve pocket 128. The operation of the aileron control is similar to the rudder and elevator control above described, and movement of valve stem 131 toward the right by energization of solenoid 132 will uncover port 133 and cause piston 127 to be moved toward the left and force the oil on the left side of the piston through 134, and passage 126 and to 123 to the left side of cylindrical portion 121, from which it will be returned to the sump by passage 136 and return pipe 137. Actuation of valve rod 131 toward the left by solenoid 135 will cause cylindrical portion 121 to uncover inlet passage 141 through which oil may flow to the left side of the piston 127 and force it toward the right to actuate the ailerons in the reverse direction.

The delivery of oil from pump 27 is preferably through a distributing device illustrated in Figs. 9 to 12 inclusive. The body of the distributing device is provided with a cylinder 151 in which reciprocates a piston 152 normally pressed toward the left, as viewed in Fig. 9, by a spring 153, held in position by an adjustable cap 154 having a vent opening 156. Oil enters cylinder 151 from the pump 27 by pipe 157, the pressure of the fluid forcing piston 152 toward the right until it uncovers relief passage 158 through which the excess flows into passage 159 and through pipe 31 back to the reservoir 29. The interior of cylinder 151 is connected to the aileron servo-motor 14 by pipe 15, the rudder servo-motor 22 by pipe 34, and the elevator servo-motor 26 by pipe 30, these pipes being in communication with the interior of the cylinder 151 at all times. The inlet 157 is connected to the outlet 31 through a passage 167 which is opened and closed by a valve 168 normally pushed to the open position by a spring 169 and forced to the closed position by the energization of the solenoid 171 connected with the valve by a link 172 pivotally mounted on the distributor by bracket 173. The arrangement of the valve and solenoid is such that upon closure of switch 33, solenoid 171 is energized and rocks link 172 in a clockwise direction, whereby valve 168 is moved to the position shown in Fig. 11 and closes passage 167, whereby direct communication with the outlet pipe 31 to cut off and the oil must be forced into cylinder 151 which is in communication with the servo-motors. If switch 33 is in the open position, spring 169 forces piston 168 toward the right and direct communication will be established between the inlet and outlet passages and there will not be sufficient pressure built up in the cylinder to actuate the servo-motors. Spring 153 is preferably of considerable length and exerts a substantial force on piston 152 when it has been moved to its extreme left position. This construction of the spring and piston causes cylinder 151 to act as a reserve container for a supply of oil under compression by spring 153. This is a very desirable feature for when any of the valves to the servo-motors is opened, there is an immediate drop in oil pressure and the use of a reserve supply under spring pressure permits the use of a smaller pump than could otherwise be used.

In the operation of the device, should the operator desire an automatic control, switch 33 will be closed whereby the pump 27 will deliver oil to each of the servo-motors and they are in a position to be acted upon by the pressure when the valves are moved by the direction-indicating instruments, it being understood that the instruments are so set that if there is any deviation from the desired attitude of the plane, the servo-motors will be actuated to operate the correct control of the plane to stabilize it and cause it to assume its original position. So long as switch 33 is closed the oil pressure will cause valve 109, Fig. 3, in both the rudder and elevator servo-motors to close communication between opposite sides of passage 69 and there can be no movement of either of these controls by actuation of the manually operated lever 17. In the neutral position of the valve all passageways from opposite sides of the piston are closed and because of the incompressibility of liquids, it will be impossible to move piston 53 until one of the exhaust passages has been uncovered, or a direct communication established between opposite ends of the piston. In the present case direct communication can be established only by a drop in oil pressure at which time valve 72 will be moved to open the opposite side of passage 69 and the manually operated control is immediately available because of the free exchange of liquid from one side of the piston to the other. This is a desirable arrangement for rudder and elevator controls, for they will rarely be adjusted during a normal flight and it is desirable to prevent operation of these members by manual control at this time because otherwise there might be an adjustment of the elevator or rudder by an accidental pressure applied to the control stick 17.

Control of the ailerons is a slightly different matter and in the construction shown they are under the control of the pilot at all times as the exhaust passages are not covered by the valve. If the control valve 76 of the aileron servo-motor be in a position to force the piston from one side to the other, the manual force applied to the stick will either augment or detract from the force normally supplied by the pump. It is desirable to have the aileron control freely movable by the control stick during a neutral position of the valve, for by this arrangement the pilot is enabled to correct his banking attitude immediately without waiting for the action of the servo-motor.

Although a preferred embodiment of the invention has been illustrated and described in the accompanying drawings, it is understood that this showing and description are illustrative only and that the invention is not regarded as limited to the form illustrated and described, or otherwise, except by the terms of the following claims.

What is claimed is:

1. In an airplane having movable surfaces rotatable about separate axes, a source of fluid pressure, manual controls for the surfaces, pressure actuated automatic controls for the surfaces, and means actuated by the fluid pressure for preventing manual control of certain of the surfaces when the automatic control is operative, and in the neutral position, said means being operative to permit manual operation upon a failure of the fluid pressure.

2. In an airplane having rudder, aileron and elevator members, automatic controls for the members, manual controls for the members, and means for preventing manual control only of the rudder and elevator when the automatic control is operative and in the neutral position, said means being operable to render the manual control operative when the automatic control is inoperative.

3. In an airplane having rudder, aileron and elevator members, automatic controls for the members, manual controls for the members, means for preventing manual control of the rudder and elevator when the automatic control only is operative and in the neutral position and said aileron control being adapted to be jointly operated at all times by both automatic and manual controls.

4. In an airplane having rudder, aileron and elevator members, automatic controls for the members, manual controls for the members, means for preventing manual control of the rudder and elevator when the automatic control is operative and in the neutral position, and all of said manual controls being interconnected with the automatic controls in a manner to be moved thereby, said means being automatically operable to render the manual control operative when the automatic control is inoperative.

5. In an airplane having rudder, aileron and elevator members, automatic controls for the members, manual controls for the members, means for preventing manual control of the rudder and elevator when the automatic control is operative, and automatic means for rendering the manual control of the rudder and elevator operative upon failure of the automatic control.

6. In an airplane having a plurality of movable surfaces rotatable about different axes and instruments for indicating the attitude of the plane with respect to the axes, a hydraulic pump, cylinders having pistons actuated by the pump and operably connected to the surfaces, valves operable by movement of the instruments for controlling fluid ingress and egress to and from opposite sides of said pistons for moving the same to correct the attitude of the plane, manual controls connected with the pistons and surfaces, and a pressure actuated valve adapted to prevent both ingress and egress from said cylinder in the neutral position of the first named valve for rendering the manual controls inoperative to move the pistons when the pressure is above a predetermined value.

7. In an airplane having a plurality of movable surfaces rotatable about different axes and instruments for indicating the attitude of the plane with respect to the axes, a hydraulic pump, cylinders having pistons actuated by the pump and operably connected to the surfaces, valves operable by movement of the instruments for controlling fluid ingress and egress to and from opposite sides of said pistons for moving the same to correct the attitude of the plane, manual controls connected with the pistons and surfaces, certain of said valves being adapted to prevent both ingress and egress from said cylinder in the neutral position of the valve for rendering the manual controls inoperative to move the pistons, and another of said valves being adapted to control fluid ingress only to the cylinder, said last named cylinder having outlet ports on opposite sides of the piston arranged to be open at all times.

8. In an airplane having a plurality of movable surfaces rotatable about different axes and instruments for indicating the attitude of the plane with respect to the axes, a hydraulic pump, cylinders having pistons actuated by the pump and operably connected to the surfaces, valves operable by movement of the instruments for controlling fluid ingress and egress to and from opposite sides of said pistons for moving the same to correct the attitude of the plane, manual controls connected with the pistons and surfaces, a pressure actuated valve adapted to prevent both ingress and egress from said cylinder in the neutral position of the first named valves for rendering the manual controls inoperative to move the pistons when the pressure is above a predetermined value, and means for establishing a communication between opposite sides of the piston upon a failure of the fluid pressure.

9. In an airplane having a plurality of movable surfaces rotatable about different axes and instruments for indicating the attitude of the plane with respect to the axes, a hydraulic pump, cylinders having pistons actuated by the pump and operably connected to the surfaces, valves operable by movement of the instruments for controlling fluid ingress and egress to and from opposite sides of said pistons for moving the same to correct the attitude of the plane, manual controls connected with the pistons and surfaces, certain of said valves being adapted to prevent both ingress and egress from said cylinder in the neutral position of the valve for rendering the manual controls inoperative to move the pistons, a conduit connecting opposite sides of said piston, and a pressure operated valve therein adapted to open said conduit upon a failure of fluid pressure.

10. In an airplane having movable surfaces rotatable about different axes and instruments for indicating the attitude of the plane, a hydraulic pump, a plurality of hydraulic servo-motors actuated by the pump and operatively connected to the surfaces, mechanical control means for the servo-motors, electrical circuits controlled by the instruments for operating the mechanical controls, a relief device for simultaneously disconnecting all servo-motors from the pump, a manual control for the surfaces connected with the servo-motors and adapted to be operative when the servo-motors are inoperative, and means operated by pump pressure for locking the manual control in certain positions of the servo-motor.

11. In an airplane having movable surfaces rotatable about different axes and instruments for indicating the attitude of the plane, a hydraulic pump, a plurality of hydraulic servo-motors actuated by the pump and operatively connected to the surfaces, mechanical control means for the servo-motors, electrical circuits controlled by the instruments for operating the mechanical controls, a relief device for simultaneously disconnecting all servo-motors from the pump, a manual control for the surfaces connected with the servo-motors and adapted to be operative when the servo-motors are inoperative, and a pressure actuated valve in certain of said servo-motors adapted to establish a free circulation of fluid in the motors during operation of the manual control and to obstruct free circulation of fluid during actuation of the surfaces by the servo-motors.

12. In an airplane having movable surfaces, hydraulic servo-motors for operating the surfaces, indicating instruments for controlling the servo-motors, a hydraulic pump having a fluid connection with the servo-motors, a distributing device between the pump and servo-motors adapted to store a reserve supply of fluid, means for forcing said reserve supply into the fluid connection when fluid flow is established in the connection by actuation of the servo-motors, and means for establishing fluid flow through the device after a predetermined pressure has been reached.

13. In an airplane having movable surfaces, hydraulic servo-motors for operating the surfaces, indicating instruments for controlling the servo-motors, a hydraulic pump having a fluid connection with the servo-motors, a distributing device between the pump and servo-motors adapted to store a reserve supply of fluid, means for forcing said reserve supply into the fluid connection when fluid flow is established in the connection by actuation of the servo-motors, means for establishing a fluid flow through the device after a predetermined pressure has been reached, and manually controlled means for preventing actuation of the servo-motors.

14. In an airplane having movable surfaces, hydraulic servo-motors for operating the surfaces, indicating instruments for controlling the servo-motors, a hydraulic pump having a fluid connection with the servo-motors, a distributing device between the pump and servo-motors adapted to store a reserve supply of fluid, means for forcing said reserve supply into the fluid connection when fluid flow is established in the connection by actuation of the servo-motors, and a manually controlled valve in the device adapted to short circuit the pump and release the reserve supply.

15. In an airplane having rudder, elevator and aileron members, automatic controls therefor including hydraulic operated pistons and a fluid pressure system, a distributing device having a spring operated piston and a cylinder therefor adapted to store a reserve supply of fluid upon movement of the piston, means in the device for relieving pressure in the system and on the reserve supply, and manual controls for the members adapted to actuate the same when the pressure is relieved.

16. In an airplane having a movable control surface, a source of fluid pressure, an automatic control for the surface including a pressure actuated piston movable in a cylinder, a manual control for the surface movable with the piston, a valve having operative and neutral positions for controlling pressure to the cylinder in a manner to prevent operation of the piston by the manual control when the valve is in a neutral position, and an automatic pressure controlled valve actuated by said source of fluid pressure for rendering the manual control operable when the pressure is reduced below a predetermined value.

17. In an airplane having a movable control surface, a source of fluid pressure, an automatic control for the surface including a pressure actuated piston movable in a cylinder, conduits having ports communicating pressure to the cylinder on opposite sides of said piston, a valve having operative and neutral positions for controlling said ports arranged to close the same in the neutral position of the valve and to prevent transfer of fluid from one side of the piston to the other whereby the piston is restrained against movement, a manual control for the surface movable with the piston, means forming a passage connecting opposite sides of said piston, and a pressure actuated valve in said passage actuated by said source of fluid pressure and arranged to close the passage when the pressure is sufficient to operate the automatic control and to open said passage when the pressure falls below a predetermined value.

18. In an airplane having movable surfaces rotatable about separate axes, a power source, manual controls for the surfaces, power actuated automatic controls for the surfaces, means actuated by the power source for restraining manual control of certain of the surfaces when the automatic control is operative and is in the neutral position, said manual control being movable with the automatic control, and said restraining means being controlled by said power source in a manner to render said restraining means inoperative upon failure of the power whereby the surfaces may be freely actuated thereafter by manual control.

19. In an airplane having a plurality of movable surfaces individually rotatable about coordinate axes, a source of pressure, a pressure actuated servo-motor for rotating each surface, automatic control means for the servo-motors, manual control means for each surface, one of said servo-motors being adapted to be prevented from actuation of the same by the manual control in one position of the automatic control, another of said servo-motors being adapted to be influenced by movement of the manual control by the operator in all positions of the automatic control, a single control device for rendering all servo-motors inoperative, and a device actuated by said source of pressure and associated with the servo-motor which is adapted to be prevented from operation by the manual control, said last-named device being arranged to render the manual control operative upon a failure of pressure.

20. In an airplane having rudder, aileron and elevator members, a source of power, power actuated automatic controls for the members, manual controls for the members, means for preventing manual movement only of the rudder and elevator when the automatic control is operative and in the neutral position, means for simultaneously rendering the automatic controls inoperative and the manual controls operative, and devices actuated by said source of power and associated with the rudder and elevator automatic controls for rendering the manual controls of the rudder and elevator operative upon a failure of the power supply.

21. In an airplane having a plurality of movable surfaces rotatable about different axes and instruments for indicating the attitude of the airplane with respect to the axes, a source of hydraulic pressure, cylinders having pistons actuated by the source of pressure, valves operable by movement of the instruments for controlling fluid ingress and egress to and from opposite sides of said pistons for moving the same to correct the attitude of the airplane, manual controls operatively connected to the pistons and adapted to move the same to control the surfaces, passages connecting opposite sides of said pistons, and a valve in the passage of one of said cylinders actuated by said source of pressure to prevent both ingress and egress from said cylinder in the neutral position of the first named valve and a spring for moving said pressure actuated valve to open said passageway whereby said piston may be moved by the manual control when the pressure falls below a predetermined value.

CLINTON H. HAVILL.